United States Patent [19]

Stecklein

[11] 4,188,146
[45] Feb. 12, 1980

[54] ARTICULATED JOINT INCLUDING BELLEVILLE SPRING SEALS MAINTAINED IN A PRESELECTED COMPRESSED STATE

[75] Inventor: Gary L. Stecklein, Dubuque, Iowa
[73] Assignee: Deere & Company, Moline, Ill.
[21] Appl. No.: 20,578
[22] Filed: Mar. 15, 1979
[51] Int. Cl.² ............................................. F16C 11/00
[52] U.S. Cl. ..................... 403/158; 403/288; 277/236; 172/273
[58] Field of Search ............... 403/157, 158, 161, 162, 403/163, 146, 288, 154, 156; 277/95, 236; 37/118 A, 118 R, 17.5; 172/273, 762

[56] References Cited

U.S. PATENT DOCUMENTS

| | | | |
|---|---|---|---|
| 1,363,477 | 12/1920 | Lowe | 403/156 |
| 3,554,588 | 1/1971 | Reinsma et al. | 403/154 |
| 3,923,313 | 12/1975 | Bailey | 277/63 |
| 3,997,274 | 12/1976 | Iverson | 403/10 |
| 4,004,855 | 1/1977 | Stecklein | 403/288 |

Primary Examiner—Andrew V. Kundrat

[57] ABSTRACT

A first member includes a pair of parallel portions disposed on opposite sides of a second member and pivotally interconnected thereto by means of a pivot pin assembly including aligned holes in the parallel portions and the second member. The pivot assembly further includes a bushing received in the hole in the second member and a pin received in the bushing and in the holes in the parallel portions. Received on one end of the pin and welded thereto to form an integral part thereof is a collar while a cap is secured over the other end of the pin by a cap screw. First and second flat washers are respectively received on the pin at the inner ends of the collar and cap and are held against opposite sides of the second member and against first and second pairs of opposed Belleville springs located at the opposite ends of the bushing.

3 Claims, 3 Drawing Figures

ARTICULATED JOINT INCLUDING BELLEVILLE SPRING SEALS MAINTAINED IN A PRESELECTED COMPRESSED STATE

BACKGROUND OF THE INVENTION

The present invention relates to articulated connections and more specifically relates to fixed width, yoke-type joints utilizing opposed pairs of Belleville washers as sealing means.

The use of Belleville springs as seals in fixed width, yoke-type joints has had limited use primarily because of the difficulty involved in assembling the joint while maintaining the desired amount of washer deflection.

U.S. Pat. No. 4,004,855 issued to the applicant of the instant application of Jan. 25, 1977, represents one solution to the problems of assembly and spring compression maintenance. In the patented structure, a first member includes a pair of parallel portions located on the opposite sides of a second member. The parallel portions and the second member are provided with aligned holes, and a bushing shorter than the length of the hole in the second member is received therein. Located on the pin at the opposite ends of the bushing are first and second pairs of opposed Belleville springs which, when uncompressed, have a length greater than the difference between the length of the bushing and that of the hole in the second member. A pair of adjustable width wedge assemblies are respectively mounted to the pair of parallel portions between the latter and the opposite sides of the second member for the purpose of compressing the sets of Belleville springs into the hole in the second member. The wedge pieces have the disadvantage of complicating the manufacture and thus unduly increasing the cost of the joint assemblies.

SUMMARY OF THE INVENTION

According to the present invention, there is provided a novel manner of constructing fixed width, yoke-type pivot joints including Belleville spring seals and, more specifically, there is provided simple means for maintaining the Belleville springs properly compressed for efficient sealing.

A broad object of the invention is to provide a yoke-type pivot joint including Belleville spring seals held in a compressed state by elements which are of simple construction and are easy to install.

Another object of the invention is to provide means for transferring side loads imposed on the member forming the outside of the yoke-type joint to the member forming the inside of the joint without going through the Belleville springs.

A more specific object of the invention is to provide a yoke-type pivot joint, as set forth in the preceding objects, wherein a collar is fixed about one end of the pivot pin to form a head and a cap is releasably secured to the other end of the pin by a cap screw, the collar and cap being a preselected distance apart when installed which results in their effecting a preselected amount of compression of the Belleville springs.

These and other objects will become apparent from a reading of the ensuing description, together with the appended drawings.

DESCRIPTION OF THE PREFERRED EMBODIMENT

Figure 1:
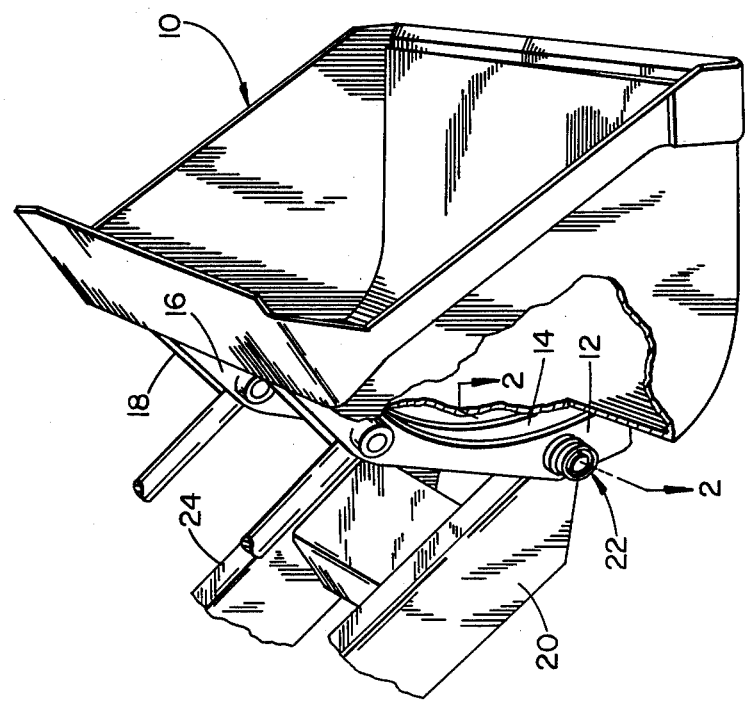
FIG. 1 is a left, rear perspective view showing a loader bucket pivotally connected to the forward ends of a pair of loader lift arms by joint assemblies embodying the principles of the present invention.

Referring now to FIG. 1, therein is shown a loader bucket 10 including, as integral portions thereof, a right pair of left and right flanges 12 and 14 and a left pair of similar left and right flanges 16 and 18. A right loader lift arm 20 has its forward end located between and pivotally connected to the right pair of flanges 12 and 14 by a pivot assembly 22 and a left loader lift arm 24 is similarly pivotally connected to the left pair of flanges 16 and 18 by a pivot assembly identical to the assembly 22. Inasmuch as the pivot assemblies are identical, only the assembly 22 is shown and discussed in detail.

Figure 2:
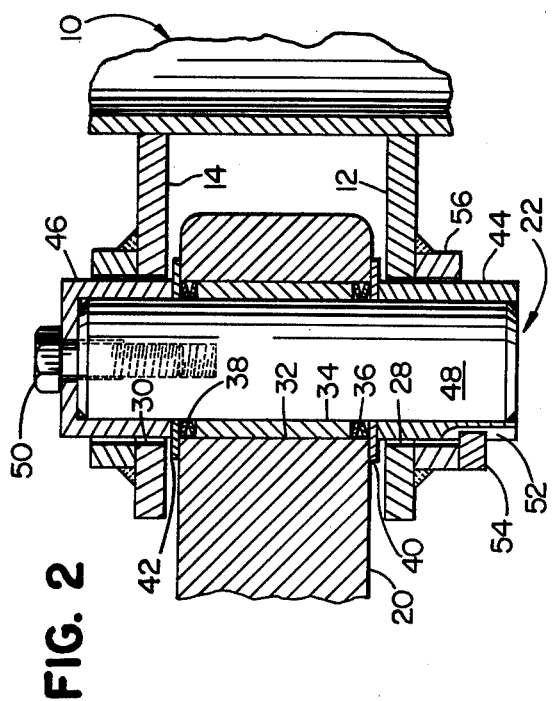
FIG. 2 is a longitudinal sectional view of one of the joint assemblies.

Thus, with reference to FIG. 2, it can be seen that the pivot assembly 22 includes holes 28 and 30 respectively located in the flanges 12 and 14 in axial alignment with each other and with a hole 32 located in the lift arm 20. A bushing 34 is press fit in the hole 32 and is a predetermined amount shorter than the length of the hole. Right and left pairs of opposed Belleville springs 36 and 38 are respectively positioned in the hole 32 at the right and left ends of the bushing 34. The pairs of springs 36 and 38 are shown in a preselected compressed state in which they are respectively held by right and left flat washers 40 and 42, which are in turn respectively held in place by a collar 44 and a cap 46 respectively received on and fixed to right and left of a pivot pin 48 received in the bushing 34. Specifically, the collar 44 is welded to the right end of the pin 48 to in effect form a head thereon while the cap is retained on the left end of the pin 48 by a cap screw 50 extending centrally through the cap and threaded into the pin. The distance between the respective inner ends of the collar 44 and cap 46 is preselected such that the washers 40 and 42 will be held tight against the opposite sides of the arm 20 and against the pairs of Belleville springs 36 and 38 when the cap screw 50 is tightened. Additional washers or shims may be used together with the washers 40 and 42 to compensate for manufacturing tolerances if necessary. To prevent the pin 48 from turning, a slot 52 is provided in the collar 44 and a key 54 is received in the slot and fixed to a cylindrical ring 56 fixed to the outer surface of the right flange 12. It is here noted that a pin with a head on it could be used in lieu of using a collar to form the head.

Figure 3:
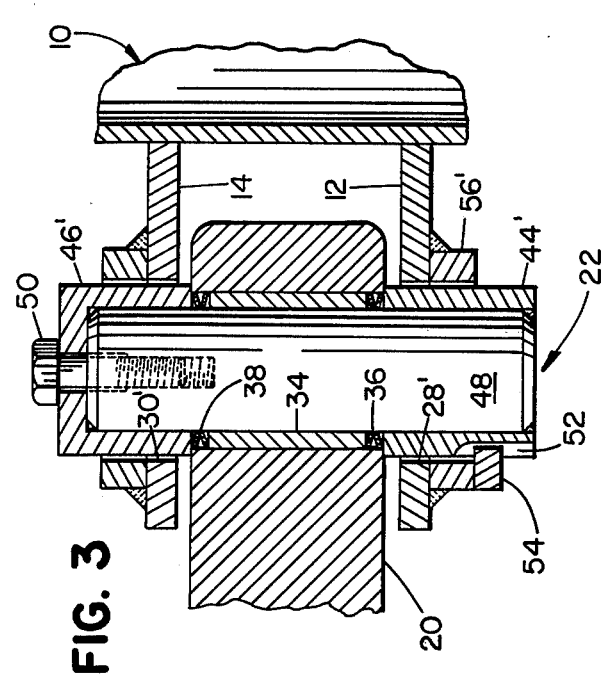
FIG. 3 is a longitudinal sectional view of an alternate embodiment of the joint assembly.

In FIG. 3, there is shown an embodiment of the pivot assembly 22 which eliminates the need for the flat washers 40 and 42. Specifically, this is down by enlarging the holes 28 and 30 in the flanges 12 and 14 to form holes 28' and 30' and by substituting an enlarged collar 44' for the collar 44 and an enlarged cap 46' for the cap 46, the collar 44' and cap 46' then acting directly against the opposite sides of the arm 20 and pairs of springs 36 and 38. Of course, this necessitates the replacement of the ring 56 by a ring 56'. All of the components which remain the same as those described in reference to FIG. 2 are given the same reference numeral.

It is be appreciated then that the collar and cap and the flat washers constitute simple parts which are easy to install and which function to maintain the pairs of Belleville springs in a preselected deflected state for efficient sealing.

I claim:

1. In an articulated connection between first and second members, the first member including a pair of parallel portions disposed on opposite sides of and pivotally interconnected to the second member by a pivot pin assembly including aligned holes located in the pair of parallel portions and the second member, a bushing press fit into the hole in the second member and receiving a pin extending into the holes in the pair of parallel portions, and first and second paris of Belleville springs respectively located against opposite ends of the bushing, the improvement comprising: said pin having a head at one end thereof located in the hole of a first one of the pair of parallel portions; a cap received on a second end of the pin and located in the hole of a second one of the pair of parallel portions; a cap screw releasably securing the cap tight against said second end of the pin; and the distance between the head and the cap bearing such predetermined relationship to the combined length of the bushing and uncompressed Belleville springs that a predetermined compression of the springs is effected when the cap screw is tightened to draw the cap against the second end of the pin.

2. The articulated joint defined in claim 1 wherein first and second flat washers are received on the pin at respective locations between the head and the first pair of opposed Belleville springs, and between the cap and the second pair of opposed Belleville springs; and said washers having an outer diameter larger than the diameter of the hole in the second member.

3. The articulated joint defined in claim 1 wherein the head and the cap have respective outside diameters greater than the diameter of the hole in the second member and the head and cap being dimensioned to concurrently compress the Belleville springs and tightly engage opposite sides of the second member when the cap is in position against the end of the pin.

* * * * *